Oct. 29, 1968　　　　　R. H. LODGE　　　　3,407,620
WATER-SOURCE HEAT PUMP SYSTEM
Filed Sept. 26, 1966
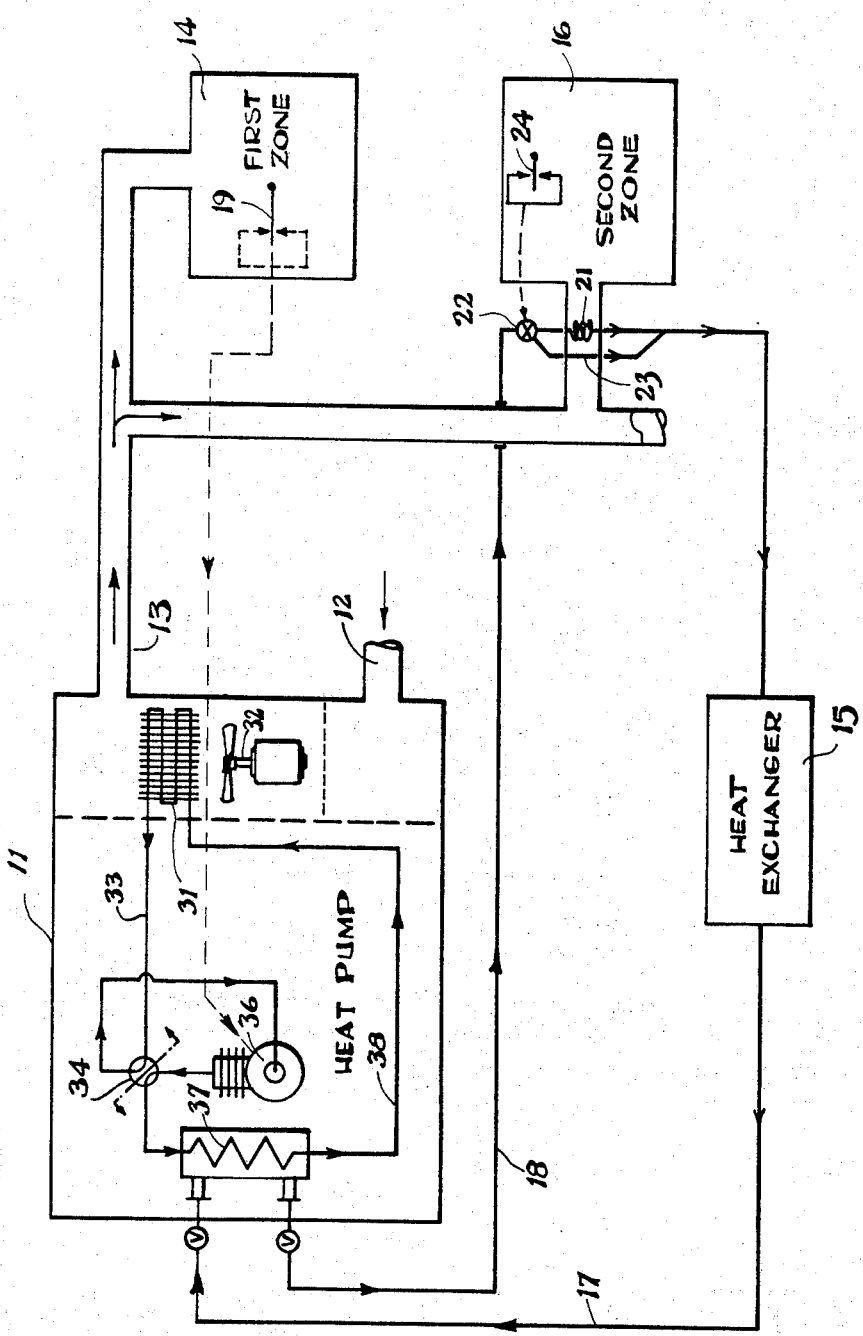
INVENTOR.
ROBERT H. LODGE
BY
Warren T. Jessup
ATTORNEY

3,407,620
WATER-SOURCE HEAT PUMP SYSTEM
Robert H. Lodge, 835 N. Hollywood Way,
Burbank, Calif. 91505
Filed Sept. 26, 1966, Ser. No. 581,994
3 Claims. (Cl. 62—159)

ABSTRACT OF THE DISCLOSURE

The system described herein is a heating-cooling air conditioning system which is useful for heating or cooling a multiplicity of different space zones having different heating or cooling requirements. The system circulates an air conditioning stream of air to a first and to at least one additional zone, and it uses water discharged from a reversible air conditioner in the system to reheat the air supplied to the additional zone during a cooling operation, an to recool the air supplied to the additional zone during a heating operation.

---

This invention resides in the field of water-source heat pump systems.

A water-source heat pump system is one in which heat is injected into or extracted from flowing water, and the heat thus transferred is used to cool or heat air, as the case may be. This air is then passed into such spaces as, for example, living quarters or other rooms where temperature control is desired. The water entering the heat pump at a substantially constant temperature is either heated or cooled, as noted. It may then be discharged or, as is more usually the case, may be recirculated through an appropriate heat exchanger and returned to the input of the heat pump. In the wintertime, heat will be extracted from the water, and, therefore, before being returned to the heat pump the water will usually be heated by some conventional form of heater employing a combustible fuel. In the summertime, the heat pump will add or inject heat into the water. The water is then run through an evaporation tower, where the heat of vaporization cools the water down to its initial temperature, at which it may be again flowed into the heat pump. Water lost through evaporation is made up from an external source.

The air, which is either heated or cooled by the heat pump, is often sent to a number of separated areas or space zones. Some of these zones may be, for example, on the exterior of the building and, therefore, more subject to outside air conditions than an interior room or zone. The control thermostat which controls the operation of the heat pump is usually placed in the zone which is most sensitive to the outside air. Under these condition, the inside room or zone is often overcorrected. For example, in the wintertime the outside zone cools down quite rapidly and constantly calls for heat. The heat pump responds but since the air is delivered both to the outside and inside zones, the inside, or sheltered zone, thus becomes too hot. In the summertime, the reciprocal phenomenon occurs, in which satisfactory cooling of the outside or exposed zone often results in overcooling of the more sheltered zone.

In accordance with the present invention, thermostat control means are provided for the secondary zone, both on the upper end and the lower end of the temperature spectrum, so that in the wintertime, when the first, exposed zone is demanding great quantities of heat, a diversion valve increases the amount of cold water flowing through a heat exchanger associated with the second or sheltered zone, and thus compensates for the temperature increase in the incoming air caused by the demands of the first or exposed zone.

In the summertime, at the lower end of the spectrum, when the sheltered zone is being overcooled, a similar phenomenon takes place, by the sensing of a drop in temperature to a predetermined point which also diverts more water to the heat exchanger. At this time, the water, of course, is hot, since the heat pump is set for summer operation.

For a full understanding of the present invention, a specific form of the system will now be described.

Referring to the figure, 11 designates an enclosure for a water-source heat pump into which air flows through a conduit 12 and out of which air flows through a conduit 13 to a plurality of space zones represented by a first zone 14 and a second zone 16. As is well known in the art, the function of the heat pump in the enclosure 11 is to inject heat into or extract heat from the incoming air 12. In the wintertime, when the ambient temperature is lower than the desired temperature in the space zones, heat must be applied to the outgoing air in conduit 13. Therefore, the heat pump serves to extract heat from inflowing water at 17 which flows out of the heat pump at 18. In the wintertime, the heat pump in the enclosure 11 is set for the reciprocal operation, in which heat is extracted from the incoming air at 12, so that the water leaving the heat pump at 18 is elevated in temperature. As noted hereinbefore, heat is either added to or extracted from the water in a heat exchanger 15, before it is recirculated to the enclosure 11.

Operative control of the heat pump in the enclosure 11 is derived from a thermostat means 19 in the zone 14, which serves to turn the heat pump on or off in accordance with the heat demands of the zone 14.

In the summertime, the heat pump is set to transfer heat from the incoming air at 12 into the outgoing water at 18. The resultant cool air flowing in the pipe or conduit 13 enters both the zone 14 and zone 16. When the zone 14 is cooled sufficiently, the thermostat means 19 cuts off operation of the heat pump in the enclosure 11. Static conditions then prevail until the temperature in the zone 14 has risen to the preset level, at which point the thermostat means 19 again turns on the heat pump in the enclosure 11 until the temperature has dropped sufficiently to de-energize the thermal control.

When air flows into the zone 14, it also flows into the zone 16. If the zone 16 happens to be more sheltered or better insulated than the zone 14, it will be overcooled, i.e., zone 14 will be calling for cooling more often than required by zone 16. To meet this problem, the outflowing water in the pipe 18 is directed through a heat exchanger 21 in heat exchange relation to the air entering the zone 16. In the summertime example now under consideration, the outflowing water in the pipe 18 has been heated considerable above the desired zone temperature. For example, in the summertime the incoming water at 17 may be 75° and it may be heated to 95° by the heat extracted from the air entering at 12, which air emerges at 13 at a temperature of perhaps 55°. The 95° water in the pipe 18 flowing through the heat exchanger 21 returns heat to the cold (55°) air entering the zone 16, and thus maintains it also at the desired zone temperature.

Control of this reheating is effected by a diversion valve 22 which in modular fashion bypasses a desired amount of the hot water around the heat exchanger 21, through a bypass pipe shown at 23. The position of the diversion valve 22 is controlled in accordance with a thermostat means 24 in zone 16, which senses a drop in temperature to a predetermined point. At this time, i.e., when the temperature has dropped to this predetermined point, the diversion valve 22 is actuated to cause an increase of water flow through the heat exchanger 21 and thus elevate the temperature of the cool air entering the zone 16. This condition prevails until the temperature at the thermostat means 24 has risen sufficiently to de-energize the diversion control, at which point the diversion valve 22 is again placed in position to divert the hot water around the heat exchanger 21.

In accordance with the present invention, the thermostat means 24 also includes a means for sensing an abnormal rise in temperature in the wintertime. In the wintertime, the heat pump in the enclosure 11 is set to extract heat from the entering water at 17, and elevate the temperature of the outflowing air at 13. For example, in the wintertime the water at 17 may enter the enclosure 11 at 75°. Extraction of heat therefrom raises the outgoing air temperature, for example, to 105°, and lowers the water temperature at 18 to perhaps 65°. This water in the first instance normally flows through the bypass conduit 23. If now the first zone 14, in order to satisfy the setting of its thermostat means 19, demands a great flow of heated air from the conduit 13, this may cause the second zone 16 to become unduly warm. This is sensed by the thermostat means 24 which, as in the case of the abnormally cool temperature, again causes the valve 22 to divert water from the bypass 23 to the heat exchanger 21. This cool water now extracts some of the heat which was injected into the air and recools it before it enters the second zone 16. When the air has been cooled sufficiently to satisfy the demand of thermostat means 24, the thermostat means calls for deactuation of the valve 22 and returns the flowing water to the bypass 23.

It will be understood that as many secondary zones 16 may be accommodated as desired, each with its own heat exchanger 21 drawing water from the outlet 18.

The components which make up the heat pump in the enclosure 11 are generally well known in the art, but for completeness of this description, will now be briefly described.

Air flowing into the enclosure at 12 is impelled past a heat exchanger 31 by means of a fan 32. In the summertime, when the heat pump is set to cool, 31 functions as an evaporator. In the wintertime when the heat pump is set to warm, 31 operates as a condenser. Assuming summertime operation, the unit 31 serves as an evaporator in which a cooling medium or refrigerant, such as Freon, boils and returns in gaseous phase via line 33 and valve 34 to a compressor 36. The refrigerant is pumped by the compressor 36 through a heat exchanger 37, transferring its heat to the water flowing in at 17 and out at 18. Liquified and relatively cool refrigerant then flows, in the line 38, to the evaporator 31, where it is vaporized, bringing about the cooling of the air which exits from the enclosure 11 by way of the conduit 13.

For winter or heating operation, the valve 34 is rotated 90°, causing the liquid refrigerant to flow from the compressor 36 to the unit 31, which now serves as a condenser, giving up heat to the air flowing from the inlet 12 to the exit 13. Liquid, relatively cool, refrigerant then flows into the conduit 38 to the exchanger 37 which now functions as an evaporator, and serves to cool the water flowing in at 17 and out at 18. The vaporized refrigerant then returns to the compressor 36 where the cycle is repeated. It will be appreciated, of course, that during either the cooling or heating operation by the heat pump, a temperature control is effectuated by the thermostat 19 which serves to turn the compressor 36 on or off so as to maintain a desired temperature in the first zone 14.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:
1. An air conditioning system including:
   a heat pump for transferring heat with respect to a first stream of a fluid by means of the reciprocal transfer of heat with respect to a second stream of a fluid;
   first and second spaced zones;
   means for introducing said first stream from said heat pump to said first and second space zones to control the temperatures thereof;
   heat exchanger means interposed in the portion of said first stream introduced to said second space zone; and
   conduit means for introducing said second stream from said heat pump into said second heat exchanger means.
2. The system defined in claim 1 and which includes first thermostat means positioned in said first space zone for controlling the operation of said heat pump.
3. The system defined in claim 2 and which includes diversion valve means for bypassing controlled portions of said second stream around said second heat exchanger means; and thermostat means positioned in said second space zone for controlling said diversion valve means in accordance with temperature variations in said second space zone.

References Cited

UNITED STATES PATENTS

| | | | |
|---|---|---|---|
| 2,292,335 | 8/1942 | Durbin | 165—22 |
| 2,513,373 | 7/1950 | Sporn | 62—160 |
| 2,930,593 | 3/1960 | Blum | 165—22 |
| 3,188,829 | 6/1965 | Siewert | 62—160 |
| 3,307,368 | 3/1967 | Harnish | 62—160 |

WILLIAM J. WYE, *Primary Examiner.*